United States Patent
Hsu

(10) Patent No.: US 11,752,052 B2
(45) Date of Patent: Sep. 12, 2023

(54) TRANSMISSION DEVICE FOR LIFTING SICKBED

(71) Applicant: NANTONG SHUNLONG PHYSICAL THERAPY EQUIPMENT CO., LTD., Rugao (CN)

(72) Inventor: Cheng-Hung Hsu, New Taipei (TW)

(73) Assignee: NANTONG SHUNLONG PHYSICAL THERAPY EQUIPMENT CO., Rugao (CN)

( * ) Notice: Subject to any disclaimer, the term of this patent is extended or adjusted under 35 U.S.C. 154(b) by 110 days.

(21) Appl. No.: 17/470,553

(22) Filed: Sep. 9, 2021

(65) Prior Publication Data
US 2023/0072650 A1    Mar. 9, 2023

(51) Int. Cl.
*A61G 7/012*     (2006.01)
*A61G 7/018*     (2006.01)
(Continued)

(52) U.S. Cl.
CPC .............. *A61G 7/012* (2013.01); *A47C 19/04* (2013.01); *A47C 19/045* (2013.01); *A61G 7/002* (2013.01);
(Continued)

(58) Field of Classification Search
CPC ........ A61G 7/012; A61G 7/018; A61G 7/002; A61G 13/02; A61G 13/06; A61G 7/00;
(Continued)

(56) References Cited

U.S. PATENT DOCUMENTS

| | | | | |
|---|---|---|---|---|
| 3,789,437 A | * | 2/1974 | Garte | A61G 7/002 5/610 |
| 5,329,657 A | * | 7/1994 | Bartley | A47C 20/041 5/616 |
| 2012/0036639 A1 | * | 2/2012 | Wu | A61G 7/05 5/618 |

FOREIGN PATENT DOCUMENTS

| | | | |
|---|---|---|---|
| CN | 203970731 U | * | 12/2014 |
| CN | 105105950 A | * | 12/2015 |
| KR | 200372964 Y1 | * | 3/2003 |

OTHER PUBLICATIONS

"Injection molding." Merriam-Webster.com Dictionary, Merriam-Webster, https://www.merriam-webster.com/dictionary/injection%20molding. Accessed Feb. 16, 2023. (Year: 2022).*

* cited by examiner

*Primary Examiner* — David R Hare
*Assistant Examiner* — Deborah Talitha Gedeon
(74) *Attorney, Agent, or Firm* — PAI PATENT & TRADEMARK LAW FIRM; Chao-Chang David Pai

(57) ABSTRACT

A transmission device for lifting a sickbed is fixed on a head mounting or a bed end of the sickbed and contains: a gear seat, a cover, a power input assembly, and a power output assembly. The gear seat includes a first conduit, a second conduit, a first opening, and a receiving orifice. The cover is covered on the first opening of the gear seat. The power input assembly includes an input shaft and a first bevel gear. The power output assembly includes an output shaft, a second bevel gear, and a support element. The support element is rotatably connected with the output shaft. The support element has multiple reinforcement ribs surrounding around an outer wall of the support element and configured to abut against an abutting fence of the second conduit, and the second bevel gear meshes with the first bevel gear.

10 Claims, 5 Drawing Sheets

(51) Int. Cl.
*A47C 19/04* (2006.01)
*A61G 7/002* (2006.01)
*F16H 57/023* (2012.01)
*F16H 57/038* (2012.01)

(52) U.S. Cl.
CPC ............ *A61G 7/018* (2013.01); *F16H 57/023* (2013.01); *F16H 57/038* (2013.01)

(58) Field of Classification Search
CPC ........ A61G 7/08; A47C 19/04; A47C 19/045; A47C 20/00; A47C 20/04; A47C 20/08; F16H 57/023; F16H 57/038; F16H 37/12
See application file for complete search history.

TRANSMISSION DEVICE FOR LIFTING SICKBED

FIELD OF THE INVENTION

The present invention relates to a transmission mechanism, and more particularly to a transmission device for lifting a sickbed which is simplified and is fixed and maintained easily.

BACKGROUND OF THE INVENTION

A conventional manual transmission device is applicable for a sickbed in a linear transmission manner, and a drive structure of the manual transmission device contains a driving shaft fixed on a gear box or a universal joint, and an end of the driving shaft is connected with a manual rotation device so as to rotate the manual rotation device to drive the driving shaft, and the driving shaft drives the sickbed to lift and descend.

However, such a transmission device is operated troublesomely and in a large resistance and a large operation space. Furthermore, the transmission device is operated manually and is removed inconveniently. The gear box occupies large operation space and has complicated structure.

The present invention has arisen to mitigate and/or obviate the afore-described disadvantages.

SUMMARY OF THE INVENTION

The primary objective of the present invention is to provide a transmission device for lifting a sickbed which is capable of reducing a material cost and enhancing easy connection by simplifying a gear seat.

Another objective of the present invention is to provide a transmission device for lifting a sickbed which is operated flexibly and is connected, removed, and maintained easy.

To obtain the above objective, a transmission device for lifting a sickbed provided by the present invention is fixed on a head mounting or a bed end of the sickbed and contains: a gear seat, a cover, a power input assembly, and a power output assembly.

The gear seat is one-piece formed and includes a first conduit extending and communicating along a horizontal axis, a second conduit perpendicular to and orthogonal with the first conduit, a first opening defined on a first side of the first conduit, a receiving orifice defined on a second side of the first conduit, and a second opening formed on an outer end of the second conduit. The first conduit is in communication with the second conduit.

The cover is covered on the first opening of the gear seat.

The power input assembly includes an input shaft rotatably connected in the first conduit and includes a first bevel gear connected on the input shaft. The input shaft of the power input assembly is rotatably accommodated between the receiving orifice of the gear seat and the cover.

The power output assembly includes an output shaft rotatably connected in the second conduit, a second bevel gear connected on the output shaft of the power input assembly, and a support element received in the second conduit from the second opening. The support element is rotatably connected with the output shaft of the power output assembly, the support element has multiple reinforcement ribs surrounding around an outer wall of the support element and configured to abut against an abutting fence of the second conduit, and the second bevel gear meshes with the first bevel gear.

DETAILED DESCRIPTION OF THE PREFERRED EMBODIMENTS

Figure 1:
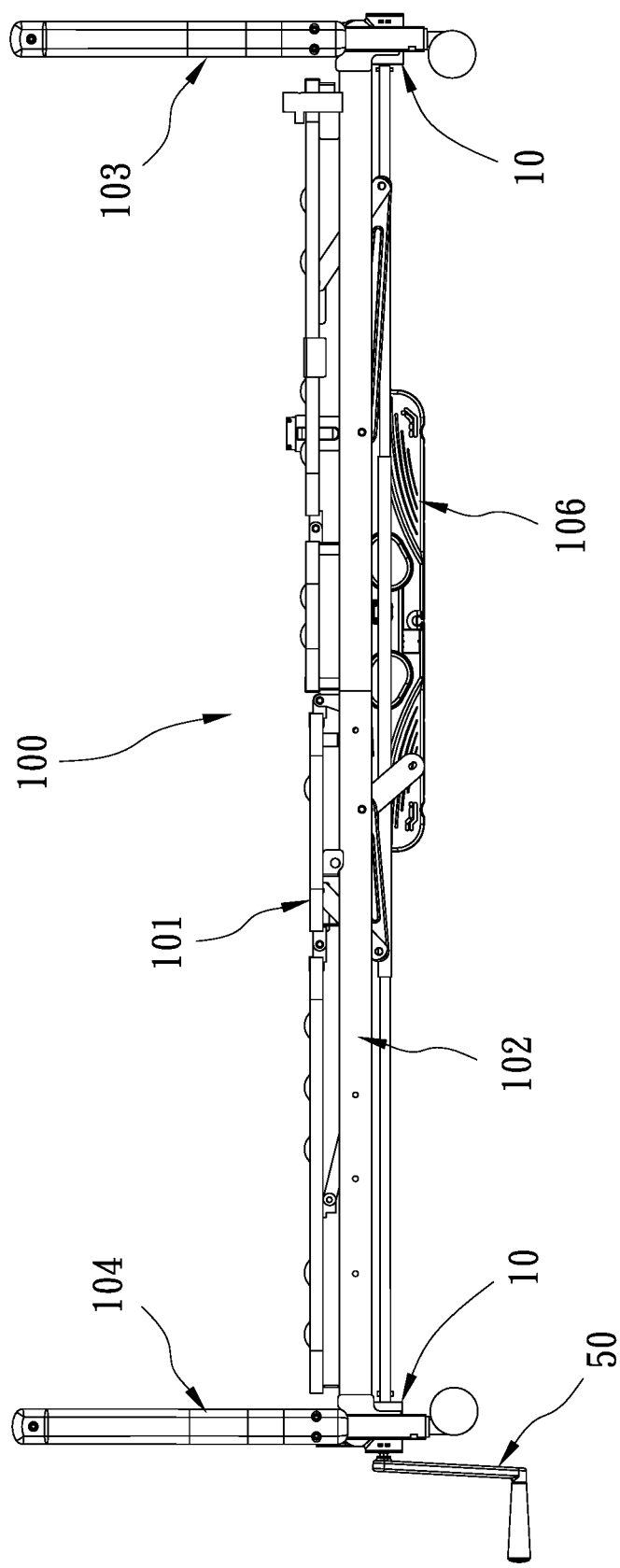
FIG. 1 is a side plan view showing the application of a transmission device for lifting a sickbed according to a preferred embodiment of the present invention.
Figure 5:
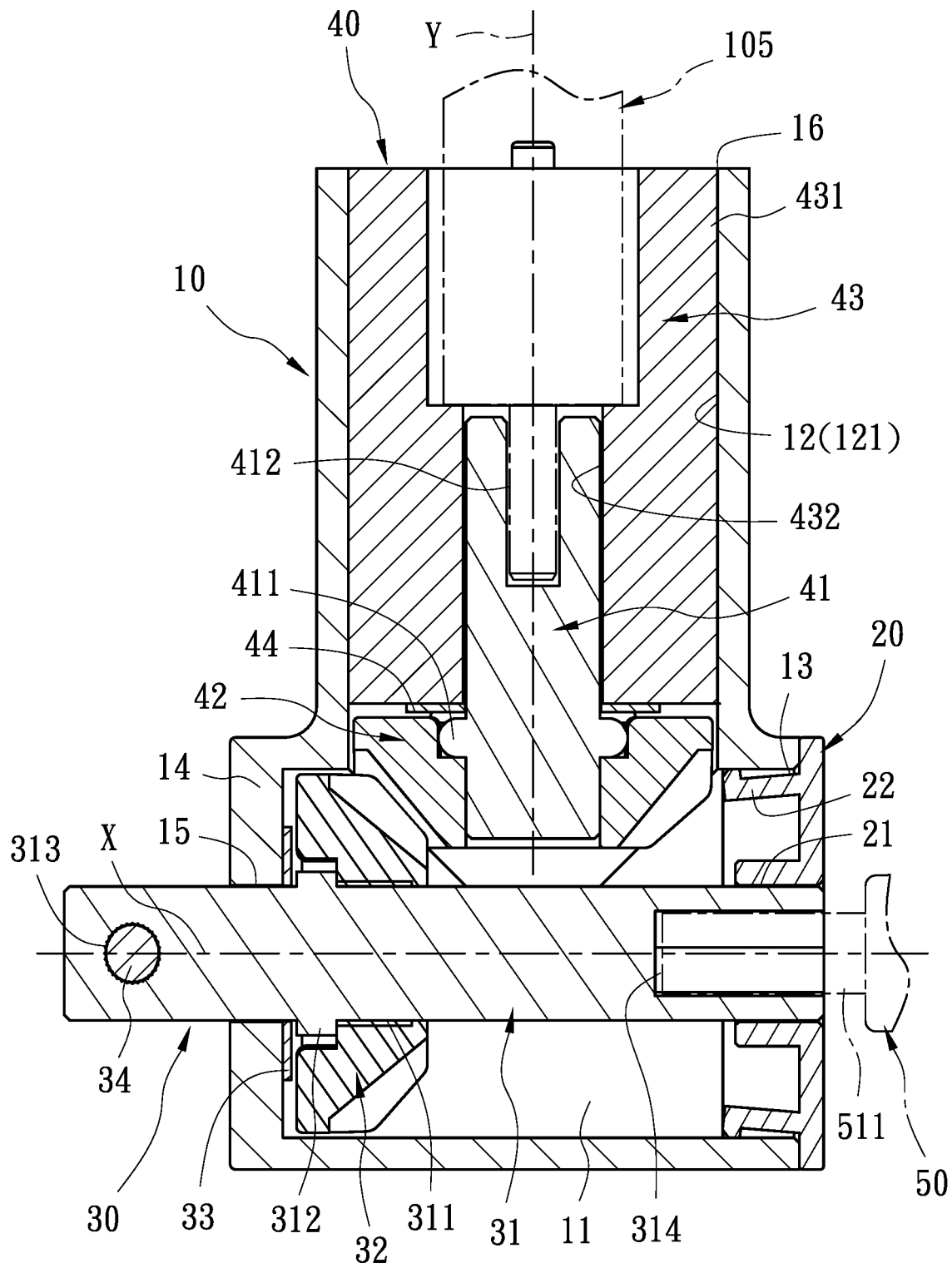
FIG. 5 is a cross sectional view taken along the line A-A of FIG. 4.

With reference to FIG. 1, a transmission device for lifting a sickbed 100 according to a preferred embodiment of the present invention, the sickbed 100 comprises a body 101, a holding frame 102, a head mounting 103, and a bed end 104. The transmission device is fixed on the head mounting 103 or the bed end 104 so as to drive the body 101 to lift and descend and to fix the body 101 on the holding frame 102. The transmission device is connected with a screw rod 105 (as shown in FIG. 5) of the head mounting 103 or the bed end 104, and the screw rod 105 is driven by a manual rotation member 50 or a motor 106, such that the body 101 is driven by the transmission device to lift and descend. In this embodiment, the sickbed 100 is manually/automatically lifted or descended.

Figure 2:
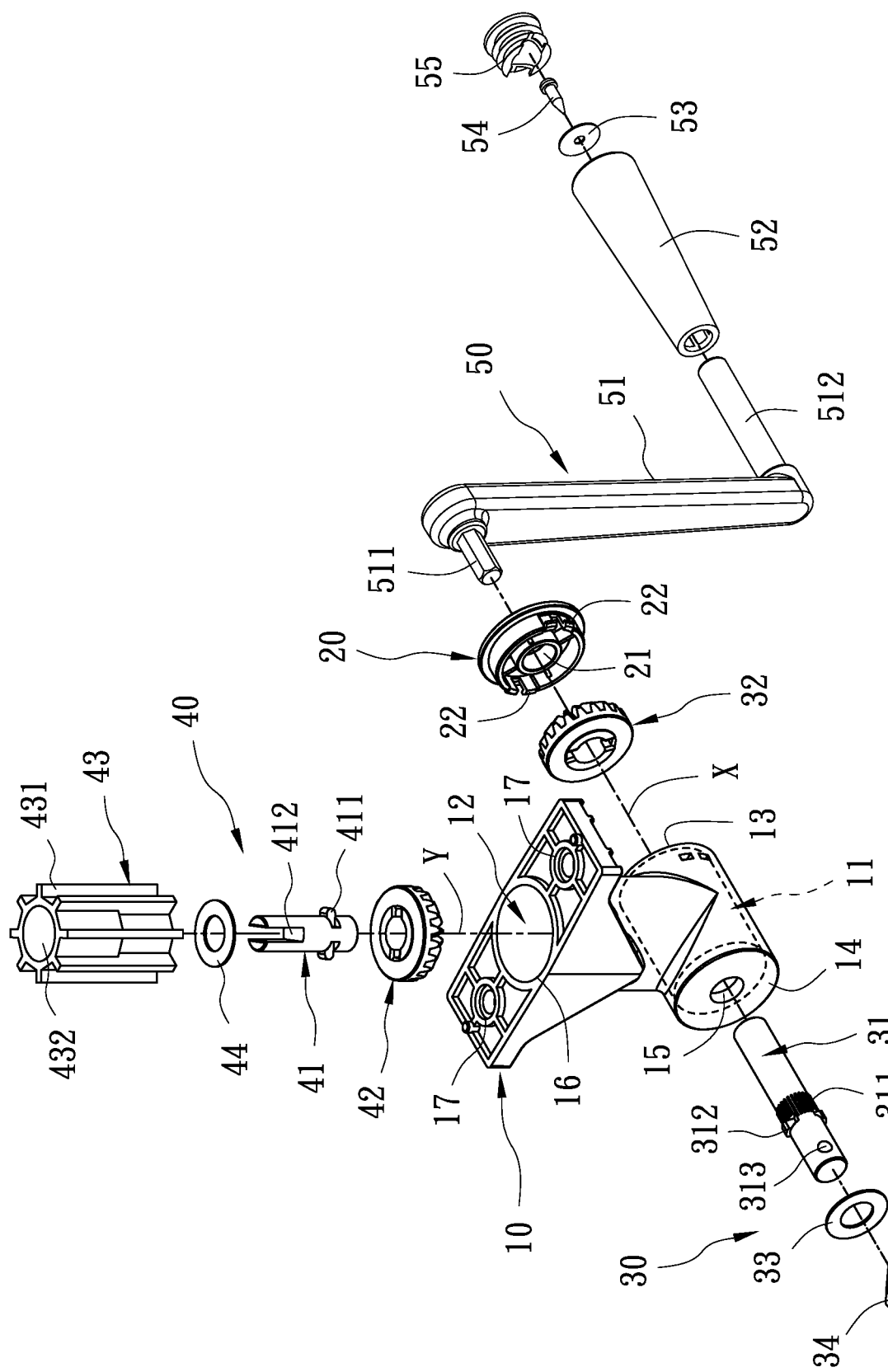
FIG. 2 is a perspective view showing the exploded components of the transmission device for lifting the sickbed according to the preferred embodiment of the present invention.
Figure 3:
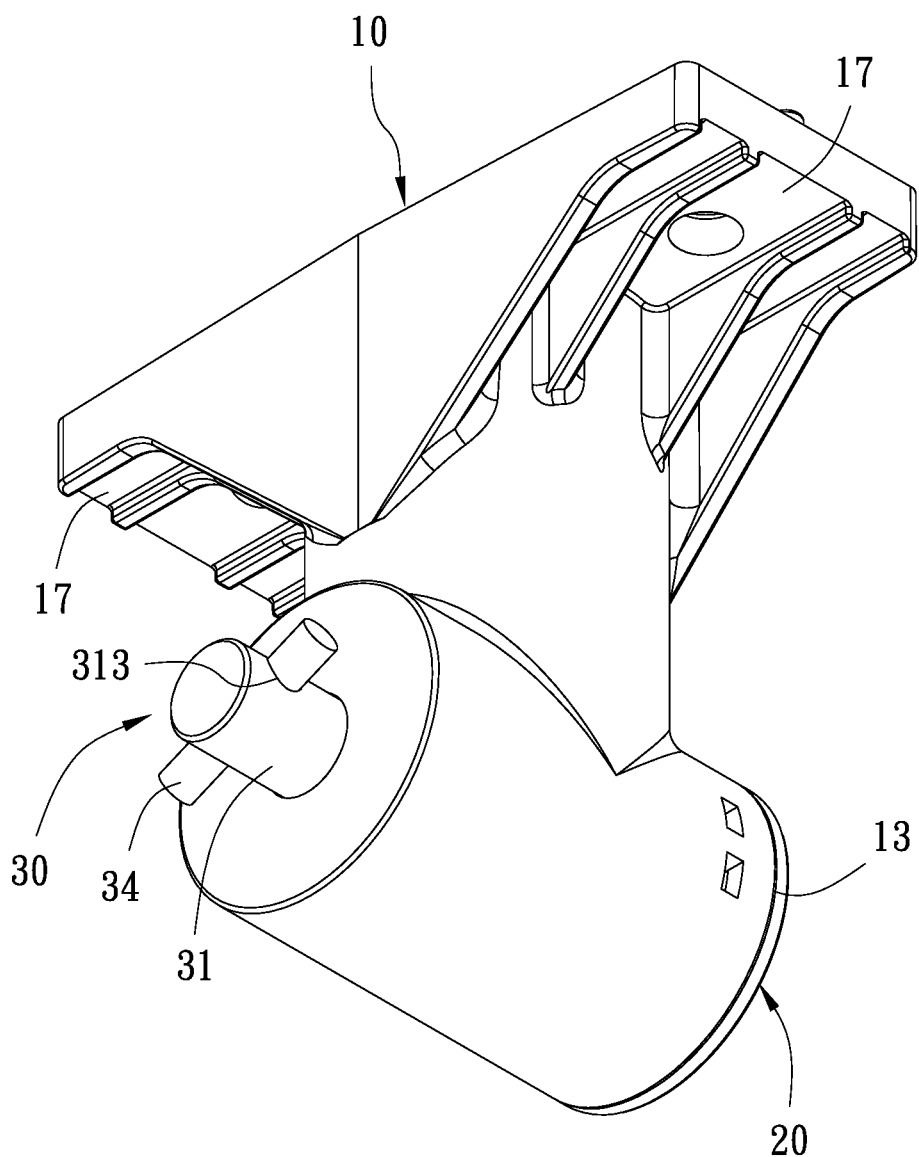
FIG. 3 is a perspective view showing the assembly of the transmission device for lifting the sickbed according to the preferred embodiment of the present invention.

Referring to FIGS. 2 and 3, the transmission device comprises a gear sea seat 10, a cover 20, a power input assembly 30, and a power output assembly 40.

Figure 4:
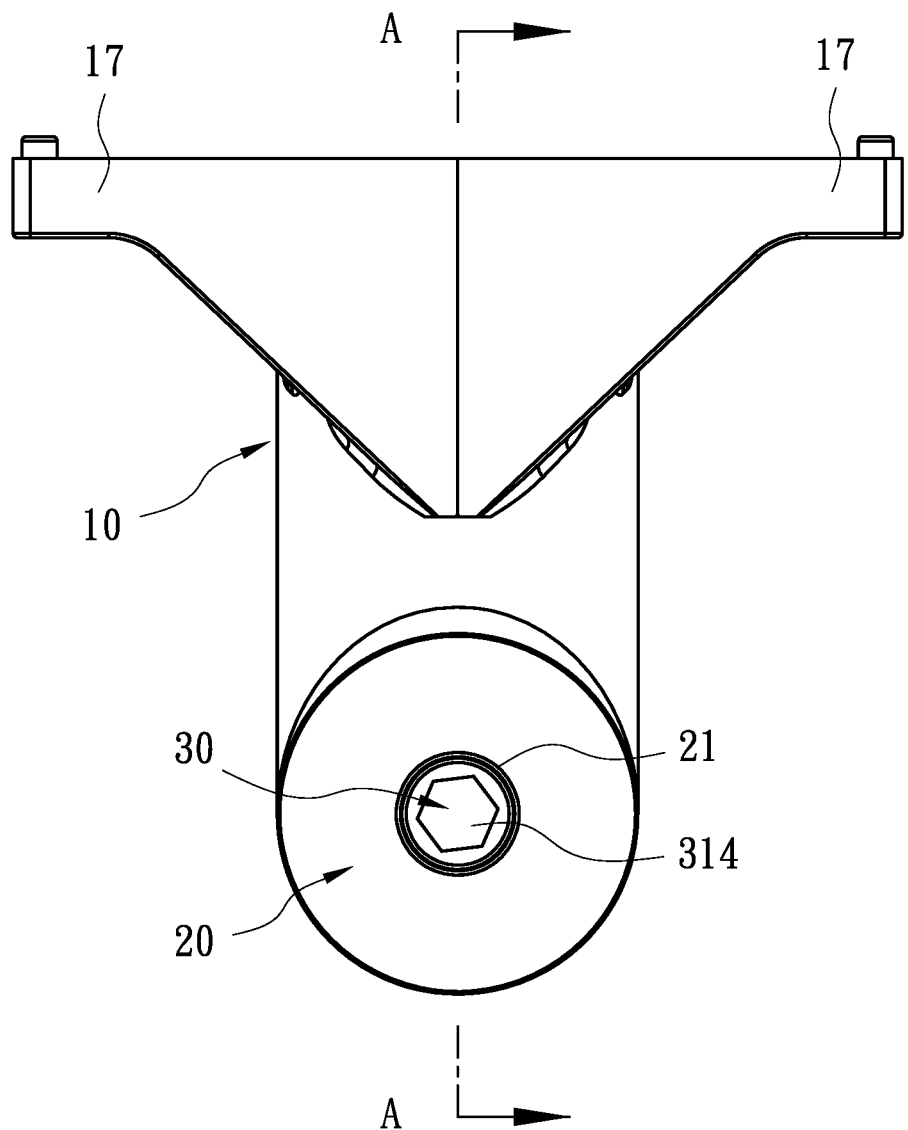
FIG. 4 is a side plan view showing the assembly of the transmission device for lifting the sickbed according to the preferred embodiment of the present invention.

As shown in FIGS. 4 and 5, the gear seat 10 includes a first conduit 11 extending and communicating along a horizontal axis X, a second conduit 12 perpendicular to and orthogonal with the first conduit 11, a first opening 13 defined on a first side of the first conduit 11, a peripheral fringe 14 formed on a second side of the first conduit 11, a receiving orifice 15 defined on a center of the peripheral fringe 14, and a second opening 16 formed on an outer end of the second conduit 12, wherein the first conduit 11 is in communication with the second conduit 12. The gear seat 10 is one-piece formed from plastic or metal, wherein when the gear seat 10 is one-piece formed from the metal, a heat resistance of the gear seat 10 is achieved. The gear seat 10 further includes two locking extensions 17 formed on the outer end of the second conduit 12 outside the second opening 16 so as to be locked on the head mounting 103 or the bed end 104, and the two locking extensions 17 are defined by multiple inverted triangle ribs which are spaced so as to save fabrication cost and to enhance reinforcement, as illustrated in FIG. 3.

The cover 20 is covered on the first opening 13 of the gear seat 10, wherein the cover 20 is in an inverted U shape, and the cover 20 includes a through orifice 21 extending along the horizontal axis X, and multiple flexible tenons 22 formed on an inner wall of the cover 20 and configured to retain the cover 20 on the first opening 13 of the gear seat 10, thus closing the first conduit 11.

The power input assembly 30 includes an input shaft 31 rotatably connected in the first conduit 11, a first bevel gear 32 connected on the input shaft 31, a first washer 33, and a connection bolt 34.

The input shaft 31 is rotatably accommodated between the receiving orifice 15 of the gear seat 10 and the through orifice 21 of the cover 20, and the input shaft 31 has a threaded section 311 formed on a middle portion thereof, a first flat key 312 formed beside the threaded section 311, a fixing orifice 313 defined on a first end of the input shaft 31, and a hexagonal counterbore 314 formed on a second end of the input shaft 31.

The first bevel gear 32 is fitted on the threaded section 311 of the input shaft 31 and is connected with the first flat key 312.

The first washer 33 is fitted on the input shaft 31 and is configured to limit the first bevel gear 32.

In assembly, the first end of the input shaft 31 is inserted through the receiving orifice 15 of the gear seat 10 so that the connection bolt 34 is inserted into the fixing orifice 313, and the second end of the input shaft 31 is inserted on the through orifice 21 of the cover 20, wherein the hexagonal counterbore 314 is exposed outside so as to receive the manual rotation member 50, thus driving the body 101 to lift and descend manually.

The power output assembly 40 includes an output shaft 41 rotatably connected in the second conduit 12, a second bevel gear 42 connected on the output shaft 41, a support element 43 received in the second conduit 12 from the second opening 16, and a second washer 44.

The output shaft 41 has a second flat key 411 formed on a first end thereof, and the output shaft 41 has a slot 412 defined on a second end of the output shaft 41. The support element 43 is in an octagon shape, wherein the support element 43 has multiple reinforcement ribs 431 surrounding around an outer wall of the support element 43, and the support element 43 has a passing orifice 432 extending along a vertical axis Y. The second bevel gear 42 is fitted on the first end of the output shaft 41 and is connected with the second flat key 411. The second washer 44 is fitted on the output shaft 41 to limit the support element 43. The passing orifice 432 of the support element 43 is fitted on the second end of the output shaft 41 and communicates with the slot 412, and the multiple reinforcement ribs 431 of the support element 43 abut against an abutting fence 121 of the second conduit 12. The passing orifice 432 is stepped so as to screw with the screw rod 105.

The power input assembly 30 is accommodated in the first conduit 11 and is fixed between the receiving orifice 15 of the gear seat 10 and the through orifice 21 of the cover 20. When the power output assembly 40 is inserted into the second conduit 12 from the second opening 16, the second bevel gear 42 meshes with the first bevel gear 32. Preferably, the first bevel gear 32 is spaced from an inner wall of the gear seat 10 by the first washer 33, and the second bevel gear 42 is spaced from the support element 43 by the second washer 42, thus avoiding friction and damage of the first bevel gear 32, the second bevel gear 42, and the gear seat 10, and the support element 43.

The power input assembly 30 further includes the manual rotation member 50, and the manual rotation member 50 has a coupling extension 51, a hollow grip 52, a third washer 53, a screw 54, and a cap 55. The coupling extension 51 has a hexagonal stem 511 extending from a first end thereof, and the coupling extension 51 has a fixing post 512 extending from a second end thereof. The hollow grip 52 is fitted on the fixing post 512, the screw 54 is configured to screw the third washer 53 and the hollow grip 52 on the fixing post 512, and the cap 55 is received in an end of the hollow grip 52 away from the manual rotation member 50. When operating the body 101 to lift and descend, the hexagonal stem 511 of the manual rotation member 50 is inserted into the hexagonal counterbore 314 to drive the input shaft 31 to rotate, and the connection bolt 34 is connected with an output shaft (not shown) of the motor 106 to drive the body 101 to lift and descend. Alternatively, the body 101 is driven by an electric automatic drive motor to lift and descend.

The support element 43 is cylindrical and is accommodated in the second conduit 16, and the support element 43 covers the slot 412 of the output shaft 41 to solve noncentric rotation of the screw 105 and the output shaft 41, thus avoiding damage of the gear seat 10 because of vibration of the output shaft 41.

Thereby, the transmission device of the present invention is capable of simplifying the gear seat 10, saving material cost, and obtaining easy assembly. Furthermore, the hexagonal stem 511 of the manual rotation member 50 is inserted into the hexagonal counterbore 314 to drive the input shaft 31 to rotate, thus obtaining easy operation, connection, and removal.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A transmission device for lifting a sickbed being fixed on a head mounting or a bed end of the sickbed and comprising:

a gear seat one-piece formed and including a first conduit extending and communicating along a horizontal axis, a second conduit perpendicular to and orthogonal with the first conduit, a first opening defined on a first side of the first conduit, a receiving orifice defined on a second side of the first conduit, and a second opening formed on an outer end of the second conduit, wherein the first conduit is in communication with the second conduit;

a cover covered on the first opening of the gear seat;

a power input assembly including an input shaft rotatably connected in the first conduit, a first bevel gear connected on the input shaft, wherein the input shaft of the power input assembly is rotatably accommodated between the receiving orifice of the gear seat and the cover; and a power output assembly including an output shaft rotatably connected in the second conduit, a second bevel gear connected on the output shaft, and a support element received and fixed in the second conduit from the second opening, wherein the output shaft of the power output assembly rotates with respect to the support element, the support element has multiple reinforcement ribs surrounding around an outer wall of the support element and configured to abut against an abutting fence of the second conduit, and the second bevel gear meshes with the first bevel gear;

wherein a diameter of the first opening is larger than an outer diameter of the first bevel gear, and a diameter of the second opening is larger than an outer diameter of the second bevel gear.

2. The transmission device as claimed in claim 1, wherein the power input assembly further includes a first washer, and the gear seat further includes a peripheral fringe formed on the second side of the first conduit, wherein the receiving orifice is defined on a center of the peripheral fringe, and the first washer is fitted on the input shaft and is configured to limit the first bevel gear.

3. The transmission device as claimed in claim 1, wherein the power input assembly further includes a connection bolt, the input shaft of the power input assembly has a fixing orifice defined on a first end thereof and has a hexagonal counterbore formed on a second end of the input shaft, and the cover includes a through orifice defined on a center thereof, wherein the first end of the input shaft is inserted through the receiving orifice of the gear seat so that the connection bolt is inserted into the fixing orifice, and the second end of the input shaft is inserted on the through orifice of the cover, wherein the hexagonal counterbore is exposed outside.

4. The transmission device as claimed in claim 1, wherein the cover includes multiple flexible tenons formed on an inner wall thereof and configured to retain the cover on the first opening of the gear seat.

5. The transmission device as claimed in claim 1, wherein the power output assembly further includes a second washer, and the second washer is fitted on the output shaft to limit the support element.

6. The transmission device as claimed in claim 1, wherein the output shaft has a second flat key formed on a first end thereof, and the output shaft has a slot defined on a second end of the output shaft; the support element has a passing orifice extending along a vertical axis, wherein the second bevel gear is fitted on the first end of the output shaft and is connected with the second flat key; the passing orifice of the support element is fitted on the second end of the output shaft and communicates with the slot.

7. The transmission device as claimed in claim 1, wherein the gear seat is one-piece formed from plastic or metal.

8. The transmission device as claimed in claim 1, wherein the gear seat further includes two locking extensions formed on the outer end of the second conduit outside the second opening so as to be locked on the head mounting or the bed end.

9. The transmission device as claimed in claim 1, wherein the power input assembly further includes a manual rotation member, and the manual rotation member has a coupling extension and a hollow grip, wherein the coupling extension has a hexagonal stem extending from a first end thereof.

10. The transmission device as claimed in claim 9, wherein the coupling extension has a fixing post extending from a second end thereof, and the manual rotation member has a third washer, a screw, and a cap, wherein the hollow grip is fitted on the fixing post, the screw is configured to screw the third washer and the hollow grip on the fixing post, and the cap is received in an end of the hollow grip away from the manual rotation member.

* * * * *